United States Patent
Schoenberg (10) Patent No.: US 7,017,685 B2
(45) Date of Patent: Mar. 28, 2006

(54) COMBINATION PEDAL/MOTOR DRIVEN TRICYCLE

(76) Inventor: Andrew Schoenberg, 3690 E. Millcreek Rd., Salt Lake City, UT (US) 84109

( * ) Notice: Subject to any disclaimer, the term of this patent is extended or adjusted under 35 U.S.C. 154(b) by 198 days.

(21) Appl. No.: 10/369,867

(22) Filed: Feb. 21, 2003

(65) Prior Publication Data

US 2003/0217874 A1 Nov. 27, 2003

Related U.S. Application Data

(60) Provisional application No. 60/382,354, filed on May 22, 2002.

(51) Int. Cl.
*B60L 9/00* (2006.01)
(52) U.S. Cl. ............... 180/2.1; 180/65.1; 180/216
(58) Field of Classification Search ............... 180/65.1, 180/2.1, 2.2, 210, 213–216
See application file for complete search history.

(56) References Cited

U.S. PATENT DOCUMENTS

| | | | |
|---|---|---|---|
| 3,190,387 A | * | 6/1965 | Dow ............... 180/65.1 |
| 4,181,188 A | | 1/1980 | Dessert |
| 4,313,517 A | | 2/1982 | Pivar |
| RE31,156 E | | 2/1983 | Dessert |
| 4,408,776 A | | 10/1983 | Randolph et al. |
| 4,456,277 A | | 6/1984 | Carpenter |
| 4,852,898 A | | 8/1989 | Donaghue et al. |
| 4,875,699 A | | 10/1989 | Levavi |
| 5,145,196 A | | 9/1992 | Langkamp |
| 5,725,062 A | * | 3/1998 | Fronek ............... 180/2.2 |
| 6,021,862 A | * | 2/2000 | Sharan ............... 180/216 |
| 6,089,341 A | * | 7/2000 | Gingerich ............ 180/65.1 |
| 6,104,154 A | | 8/2000 | Harada et al. |
| 6,155,369 A | | 12/2000 | Whittaker |
| 6,158,542 A | | 12/2000 | Nolet |
| 6,402,174 B1 | | 6/2002 | Maurer |

* cited by examiner

*Primary Examiner*—Bryan Fischmann
(74) *Attorney, Agent, or Firm*—Marcus G. Theodore (57) ABSTRACT

A zero-emissions electric three-wheeled, enclosed scooter with two 1 hp motors driven from batteries charged by solar panels and a pedal-driven generator; also incorporating an innovative rear wheel drive and suspension system and a tilt capability to reduce parking space requirement to approximately one quarter of that of a conventional automobile.

13 Claims, 8 Drawing Sheets

COMBINATION PEDAL/MOTOR DRIVEN TRICYCLE

RELATED INVENTIONS

This application is a continuation-in-part application of the provisional application Ser. No. 60/382,354 entitled "Combination Pedal/Motor Driven Tricycle" filed May 22, 2002.

BACKGROUND OF THE INVENTION

1. Field

This invention pertains to three-wheeled vehicles. More particularly it relates to a zero-emissions electric three-wheeled, enclosed scooter with two 1 hp motors driven from batteries charged by solar panels and a pedal-driven generator; also incorporating an innovative rear wheel drive and suspension system and a tilt capability to reduce parking space requirement to approximately one quarter of that of a conventional automobile.

2. State of the Art

Various alternative energy vehicles have been proposed to extend mileage and reduce emissions problems. Electrical-internal combustion engine hybrids that reduce pollution and decrease gas consumption are now on the market (Honda Insight and Toyota Prius). Strictly electrical cars are also available. These include the "Gizmo", "IT" and the "Think" and the "Sparrow" vehicles. The book "The New Electric Vehicles—A Clean & Quiet Revolution" (Michael Hackleman, 1996 Home Power Publication) summarizes recent alternative electric vehicles including solar powered types. Most of the solar cell powered vehicles are designed for long-range (cross-country) solar races and generally large (2 to 5 sq. yards) of solar panels). These are not designed as commuter vehicles. A solar vehicle called the "SunCoaster" was designed as a commuter vehicle and evolved from a tricycle to a quadricycle with a steering wheel. The vehicle relied strictly on its 4 solar panels for its primary energy source and had a cruising speed of 10 mph. It did not incorporate an aerodynamic enclosure and weather protection. There is no indication that a patent was filed on the SunCoaster.

U.S. Pat. No. 6,021,862 describes an electric tricycle driven by one electric motor supplied by batteries, which are recharged by solar panels. The solar panels are mounted on the roof of the vehicle and track the sun via a stepper motor. All the drawings show 4 four rear wheels. There is not an adequate description for the rationale and mechanical connection required to construct such a vehicle. The specification is not adequate to build a practical vehicle.

There are also a number of pedal and motor assist driven vehicles. Dessert, U.S. Pat. No. 4,181,188 and its reissue 31,156 disclose four wheeled vehicles having a unique canting of the rear wheels during turns, which steers from the front wheels. Maurer, U.S. Pat. No. 6,402,174 B1 discloses a pedal driven three-wheeled vehicle with an adjustable leaning and steering mechanism as the vehicle makes a turn. Nolet, U.S. Pat. No. 6,158,542 discloses a motor-assisted pedal tricycle driven by a single electrical motor. Whittaker, U.S. Pat. No. 6,155,369 discloses an electric motor driven bicycle. Harada et al, U.S. Pat. No. 6,104,154 discloses a tricycle driven by an electric motor and pedal drive. Lankkamp, U.S. Pat. No. 5,145,196 discloses a collapsible pedal driven tricycle. Levavi, U.S. Pat. No. 4,875,699 discloses a two person human pedal driven tricycle. Donoghue et al, U.S. Pat. No. 4,852,898 discloses a collapsible hydraulic pedal-operated polycycle employing a hydraulic cylinder and piston system to amplify the pressure of the pedaling action. Carpenter, U.S. Pat. No. 4,456,277 discloses a human powered front wheel drive tricycle having two steerable front wheels. Randolph et al, U.S. Pat. No. 4,408,776 discloses a three-wheeled vehicle with a rotatable laterally pivotable wheel for turning the vehicle. Pivar, U.S. Pat. No. 4,313,517 discloses a three-wheeled vehicle driven by a one Hp electric motor, assisted by a pedal drive. The analysis of required power and energy for these vehicles is not adequate. For example in U.S. Pat. No. 4,313,517 the electric motor is specified at ½ to 1 Hp with a vehicle and 2 passenger weight specified at 700 lbs. The specification for speeds of 15 to 25 mph may be sustained on flat grounds but engineering analysis shows that at even a slight grade of 5% the vehicle could at best travel at 7 mph.

The Ecotrike™ invention described below discloses an enclosed, energy efficient, rechargeable solar motor driven pedal tricycle, which provides an efficient commuter vehicle.

OBJECTIVES OF THE INVENTION

The vehicle described in this invention was conceived to solve several serious problems associated with our current automobile-centered transportation system.

Minimizing air pollution.

Minimize parking areas.

Greater Safety and Comfort for Rider.

Optimal Operating Efficiencies.

Multi-power sources.

These objectives are more particularly discussed below.

SUMMARY OF THE INVENTION

The invention, known as an Ecotrike™ vehicle, is a three-wheeled electric scooter designed as a low speed commuter vehicle with maximum speed of 25 mph (40 km/hr). It comprises a tiltable frame having a steering end, a driving end, and a support platform. The frame is structured to provide a passenger compartment and seating area for a passenger, when in use. When not in use, the vehicle is tilted to upend the steering end to stand the vehicle onto its support platform, when parked. A steering wheel is rotatably and pivotally mounted on the steering end via a steering assembly. The steering assembly is operably associated with the steering wheel to turn said steering wheel in a desired direction when activated by an operator.

A pair of drive wheels is rotatably mounted on the driving end via a pair of rear wheel suspension and drive assemblies. Dual directional electric motors are attached to the frame and are operably associated with each of the drive wheels to move the tricycle in the desired direction. These separate drive motors adjust wheel speeds automatically under turning resistance to provide for different wheel speeds needed when going around curves; thereby eliminating the need for a differential gear. They also provide 2 hp continuous and up to 6 hp intermittent horsepower output as needed.

These wheel suspension and drive assemblies associated with each drive wheel may each have a separate combination chain drive and V-belt drive using different size pulleys and chain rings to provide a desired wheel drive ratio and some slippage under high loads or shock loads when driven by forward and reverse electric motors. A storage battery mounted to the frame is operably associated with the electric motors to power them. Preferably, the storage battery has sufficient energy storage capacity to power the vehicle at an average of 1000 watts (1.3 hp) for one hour. At an average speed of 20 mph this represents a range of 20 miles, assuming a mostly flat terrain with intermittent hills of 5 to 10% grade. A pedal operated electric generator is mounted to the frame and operably associated with the storage battery to charge said battery when pedaled by the driver to provide supplemental power.

An aerodynamic enclosure with a top, windows and door form a passenger compartment, which is attached to the frame through which a passenger may enter and exit the passenger compartment. A molded adjustable plastic seat with a lap and shoulder belt and roll bar is provided for enhanced comfort and safety. A solar panel is mounted to the top of the aerodynamic enclosure and is also operably associated with the storage battery to charge the battery. During periods of prolonged cloudy conditions, the vehicle requires energy stored in the batteries, or an external battery charger would need to be employed.

Operating controls mounted to the frame within the passenger compartment are associated with the electric motor and battery to selectively activate the same to drive the drive wheels and power the vehicle at the desired speed and direction.

Preferably, there are two rear wheel suspension and drive assemblies. Each has a wheel frame mounting similar to that used in rear wheels of bicycles with spring and shock absorbers. The main differences are in the drive mechanism and the means of attaching the swinging wheel frame to the body of the vehicle.

The front end of the horizontal fork of the wheel frame has a metal block welded to it. It is precisely machined to fit and attach with bolts between two swinging plates. These plates are mounted on bearings, which are rigidly and concentrically attached on the outside of a cylindrical drive housing. This cylindrical drive housing is welded to the vehicle frame and has a drive shaft concentrically mounted with ball bearings inside the cylinder. A small drive sprocket is mounted on the outside of part of the drive shaft and is precisely aligned with a large sprocket mounted on the wheel. The two sprockets are connected with a bicycle chain. The inside end of the shaft has a large diameter v-belt pulley attached to it. This v-belt pulley is driven by a small pulley on the motor shaft. The combination of different size pulleys and chain sprockets result in a rotational reduction in speed and a corresponding increase in torque between the motor and the wheel of approximately 8:1.

The front wheel steering assembly preferably comprises a pivoting fork assembly with a top, and two prongs each incorporating a spring suspension shock absorber as typically used in front forks of mountain bicycles with left and right ends spaced apart to accommodate the width and diameter of a steering wheel whose axle is rotatably mounted there between to the two forked left and right ends. The top is pivotally attached to the tilting frame to rotate the steering wheel. A steering bar with ends is attached to the top of the pivoting fork assembly to turn it in a desired direction. A steering handle is turnably mounted to the tilting frame. Steering cables are attached to the ends of the steering bar and operably associated with the steering handle to turn the steering bar in response to the movement of the steering handle.

Since the steering tube and front wheel are farther from the seated operator than in a normal bicycle, the handlebars needed a modification to allow steering. This was implemented using two parallel cables to connect the bicycle type handlebars to a short steering bar mounted at the top of the wheel fork steering tube. The tube and cable lengths are adjustable to accommodate different sized operators.

To assist in stopping the tricycle, caliper brakes are attached to the front steering and rear drive assemblies and operably associated with the drive and steering wheels to selectively stop them in a braking mode, and allow them to rotate in a free wheeling mode.

The invention thus provides an enclosed, energy efficient, rechargeable solar motor driven pedal tricycle, which provides an efficient commuter vehicle to meet the above objectives. Air pollution in many urban centers has become a health hazard. This has led to a demand for vehicles with reduced or zero emissions. Furthermore it has been estimated that each car in a developed country eventually requires the creation of six parking spaces to accommodate it for work, shopping, business, civic and recreational uses. Thus, more and more valuable land is being paved to accommodate the automobile. Each parking spaces in multi-story parking buildings costs between $30,000 to $40,000 per space, leading to substantial fees. Much of the capital costs of shopping malls results from the need for acres of parking to accommodate large vehicles. The parking problem is reduced by employment of the Ecotrike™ vehicle, since it is half the width of a conventional car. It is also designed to be tilted for parking on its rear support platform; thereby taking only a quarter of a parking space.

Another objective of the invention is to provide greater safety and comfort to a rider than is offered by existing alternatives such as bicycles, scooters and tricycles. These do not have an enclosure against wind and rain and do not have a comfortable seat with a seat belt. By providing such features, the Ecotrike™ invention should attract more users to non-polluting transportation alternatives.

The Ecotrike™ vehicle also provides a commuter electric tricycle, which achieves true zero emissions by using the electric energy stored in batteries that are charged by a combination of photo-voltaic (PV) panels and a generator driven by pedaling. A fundamental constraint of a solar power based vehicle is that the sun provides on daily average of between 3000 and 7000 watt-hours of energy per square meter of area. In "sunny" states such as Arizona, California, Nevada and Utah, the average daily energy is typically 6000 watt-hours per square meter. Hybrid powered vehicles, such as the Ecotrike™ vehicle, with a solar panel size of 1.2 square meters and an energy conversion efficiency of most solar panels of 12%, can capture up to 860 watt-hrs of energy per day. One horsepower uses 745 watts of power. Thus, solar energy generated by a 1.2 sq. meter panel can provide slightly more than 1 hp for 1 hour per sunny day. The instantaneous power available from a solar panel mounted on a vehicle that is half the size of today's cars will be in the range of 100 to 150 watts. Human pedaling can augment this power by another 100 to 150 watts. Thus the instantaneous power available directly is no more than a third of a horsepower. Higher power demands such as required for hill climbing and acceleration as described above must rely on previously stored energy in the batteries.

The quantity of energy that can be stored in batteries is a chief limiting factor for electric vehicles. The currently well developed technology of lead-acid batteries has an energy density of 35 watt-hours per kg (2.2 lbs). To store enough energy for generating 2 hp (1500 watts) for 1 hour requires approximately 45 kg (100 lbs) of batteries. That is what is presently used in the Ecotrike™ vehicle. Newer battery types such as those based on Nickel Metal Hydride and Nickel Zinc have energy densities of 60 to 65 watts per kilogram, and hence can reduce the weight of the batteries by nearly 50% for the same amount of stored energy. Such batteries should soon be more widely available at a competitive cost.

The Ecotrike™ vehicle is designed to provide enough power for urban commuter applications within the constraints of energy available from solar, battery, and pedal sources. The power requirements at any given moment for a vehicle are expressed by equation 1.

$$Ptotal=Paccel+Proll+Phill+Pair \quad (1)$$

Where the power for acceleration, Paccel, is given by the equation 2.

$$Paccel=V*m*a*(1+c_w)/e \quad (2)$$

Where V is the vehicle velocity in meters/second;

m is the total mass of the vehicle and rider in Kg;

a is the acceleration of the vehicle in meters per second squared;

$c_w$ is the dimensionless correction factor to account for the rotational inertia of the wheels (note this factor is very small for bicycle type wheels and is assumed to be 0.01) and e is the overall mechanical and electrical efficiency of the vehicle. It is assumed to be 0.8.

The power to overcome the tire rolling resistance Proll is given by equation (3)

$$Proll=V*m*g*C_r/e \quad (3)$$

Where $C_r$ is the dimensionless coefficient of tire rolling resistance which typically ranges between 0.004 and 0.008 depending inversely on tire inflation pressure and g is the acceleration of gravity in meters per second squared and is equal to 9.8.

The power required to climb a hill is expressed by equation (4).

$$Phill=V*m*g*s/(e*100) \quad (4)$$

Where s is the grade of the hill in % of horizontal distance.

The power to overcome the air resistance Pair is given by equation (5).

$$Pair=V*C_d*Aden*(V+V_{hw})*(V+V_{hw})/(2e) \quad (5)$$

Where $C_d$ is the dimensionless drag coefficient, which can range from 0.1 for a streamlined sports car to 1.2 for a bicycle or square truck. A modern streamlined sedan will typically have a Cd of 0.2 to 0.6. The streamlined Ecotrike™ vehicle is assumed to have a Cd of 0.4.

A is the frontal area of the vehicle in meters squared, den is the density of air expressed in kg per cubic meter and has a value of 1.23 at sea level and a temperature of 15 degrees Celsius; and $V_{hw}$ is the head wind velocity in meters per second.

The above equations allow estimation of power requirements for various travel conditions. The total mass of the vehicle m is 220 kg (484 lbs) composed of 84 kg (185 lbs) for the vehicle structure plus 45 kg (~100 lbs) for the batteries and 91 kg (200 lbs) for a rider and freight.

The power of accelerating this 220 kg mass from a standstill to 40 km/hr (11.1 m/sec or 25 mph) can be calculated by inserting various values of acceleration in equation 2. A modest level of acceleration of 1 meter per second squared (i.e. $1/10^{th}$ of a g) requires 1200 watts of power for 11 seconds. This shows that the 2 hp designed into Ecotrike™ is needed for adequate acceleration. When steady velocity is reached, Paccel becomes zero.

At any steady speed, the Power required to keep the vehicle moving will be the sum of the remaining terms in equation 1. The power to overcome tire rolling resistance, Prol is 194 watts, per equation 3 (assuming 40 km/hr and a rolling resistance factor of 0.0065 and an efficiency of 0.8). The power to counter the air resistance at 40 km/hr is 316 watts using equation 5 for Pair, (assuming a frontal area of 0.75 meters squared, a drag coefficient of 0.4, and no head wind). Thus on level ground the steady power sums to 510 watts or about $2/3$ of a horsepower.

The power for climbing a hill Phill is computed by equation 4. A modest 5% grade at 40 km/hr requires a power of 1500 watts plus another 510 watts for air and rolling resistance or nearly 3 hp. This power can be maintained for short duration since each of the motors is capable of 3 hp intermittently without overheating.

The above analysis shows that the Ecotrike™ vehicle fits into a fairly narrow window of constraints defined by the available motor power, energy stored in the battery and solar power.

The equations can be applied to other electric vehicles. For example an electric vehicles which can travel at freeway speeds and can carry 4 passengers like conventional cars that would weigh 1500 kg (3300 lbs) with a frontal area of 1.5 meters squared with efficiency and drag coefficients similar to the Ecotrike™ vehicle would require 46000 watts of power or 62 hp to travel at 70 mph up a 5% grade. On level ground at 70 mph the power would drop to 17600 watts or 24 hp. To supply enough energy for an average of 24 hp for 1 hr per day would require solar panels of 24 meters squared. That is 12 times the area available for solar panels on the roof of a van sized passenger vehicle. This constraint would make it very difficult to create future electric vehicles that would be powered strictly from solar panels and thus be truly "zero-emissions"—i.e. not require charging the batteries from electricity generated by fossil fuels.

This analysis shows that one-way daily commuter trips by a Ecotrike™ vehicle of a distance of 10 km (6 ml) will take less than 20 minutes, assuming an average speed of 30 km/hr (19 mph). This one-way trip will not require charging the batteries from external (fossil based) sources of electricity on sunny days. It may be noted here that data published by the Detroit Automobile Manufacturer association in 1972 indicates that 75% of automobile trips are 10 miles or less of which 55% are 5 miles or less and 36% are under 3 miles. More demanding and frequent daily use of the Ecotrike™ vehicle requires additional solar panels installed at a home site to charge an auxiliary set of batteries. These are exchanged and used as needed. The amount of energy stored in the batteries and hence the range of the vehicle may be increased in the future by better batteries and fuel cells.

Unlike most electric or hybrid-electric cars currently available or under development by automakers, the Ecotrike™ vehicle is a "true" zero emissions vehicle. Its modest energy requirements can be met by pedaling and/or solar generated power, thus reducing the overall need for burning fossil fuels while reducing the associated pollution and global warming.

DESCRIPTION OF THE ILLUSTRATED EMBODIMENTS

Figure 1:
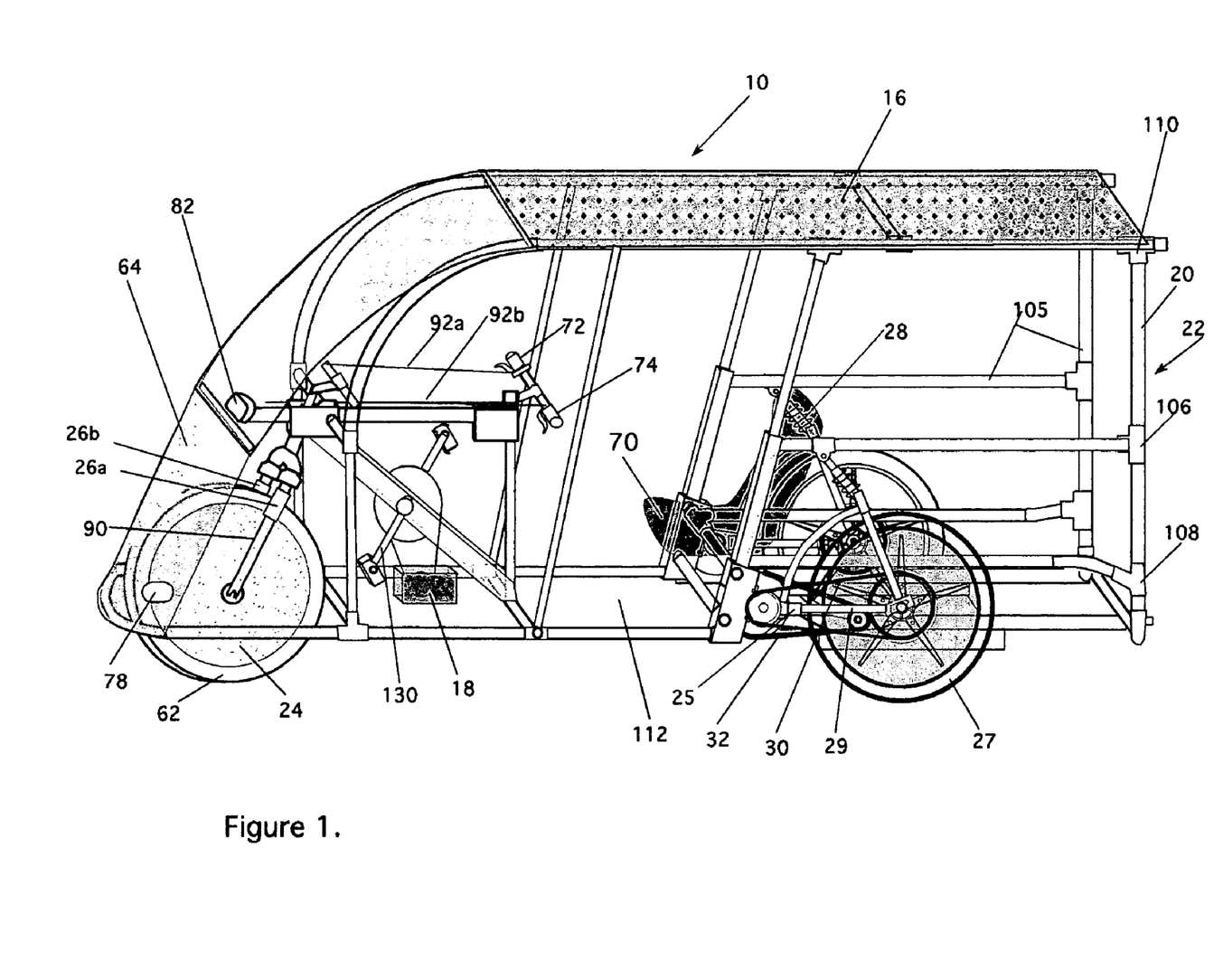
FIG. 1 is a perspective side view drawing of a preferred embodiment of the vehicle.
Figure 2:
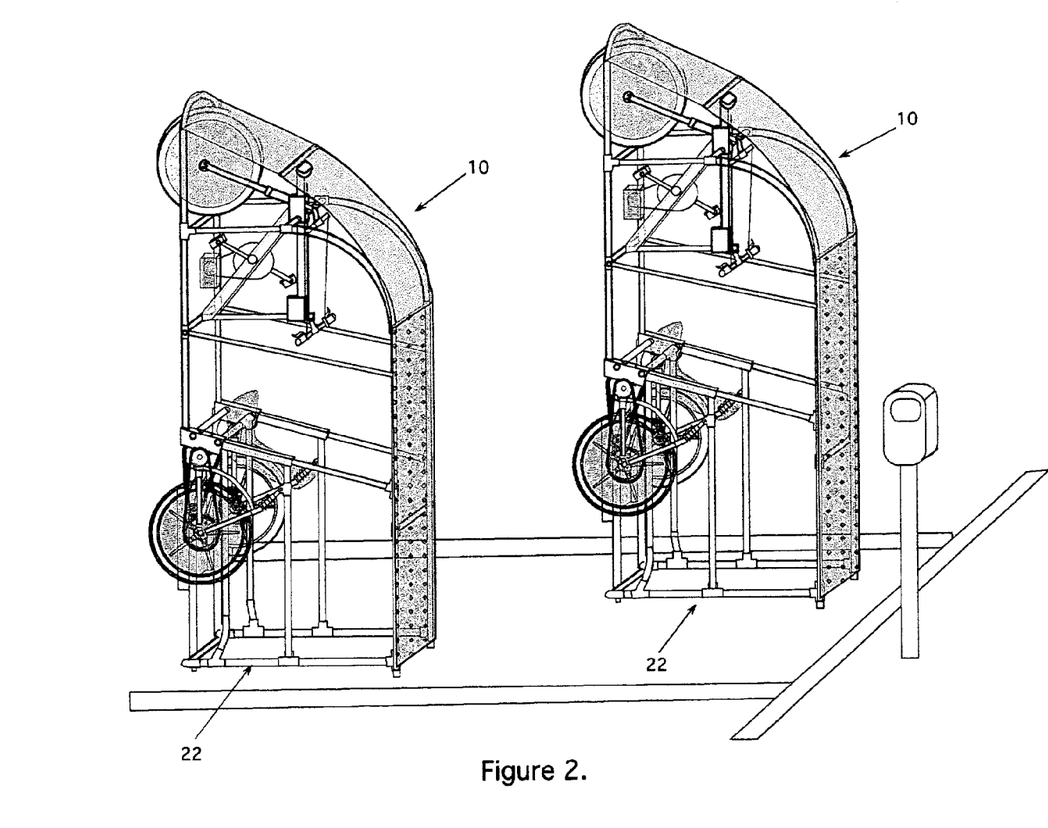
FIG. 2. is a side view of two preferred embodiments of the vehicle shown in FIG. 1 in a parked position.

FIG. 1 illustrates a preferred embodiment of the Ecotrike™ vehicle 10. The Ecotrike™ vehicle 10 is powered by two electric motors 12 shown in FIG. 4 each producing 1 hp continuous and 3 hp maximum. The motors 12 are 24-volt dc permanent magnet types with a pulse width modulation speed control supplied by two 12-volt batteries 14 shown in FIG. 4 connected in series. A unique feature of the design is that the batteries 14 are charged by a combination of photo-voltaic solar panels 16 shown in FIG. 1 and a pedal powered electric generator 18, thus obviating the need to charge the batteries 14 from electricity generated by fossil fuels. The scooter frame structure 20 and weight distribution is designed to allow tilting it on its rear 22 such that it takes one fourth of the parking space of a passenger car as shown in FIG. 2. The front wheel 24 in FIG. 1 has spring suspension with two spring suspension shock absorbers 26a, 26b mounted to the top of the fork tubes 90 as used in mountain bicycles.

Figure 3A:
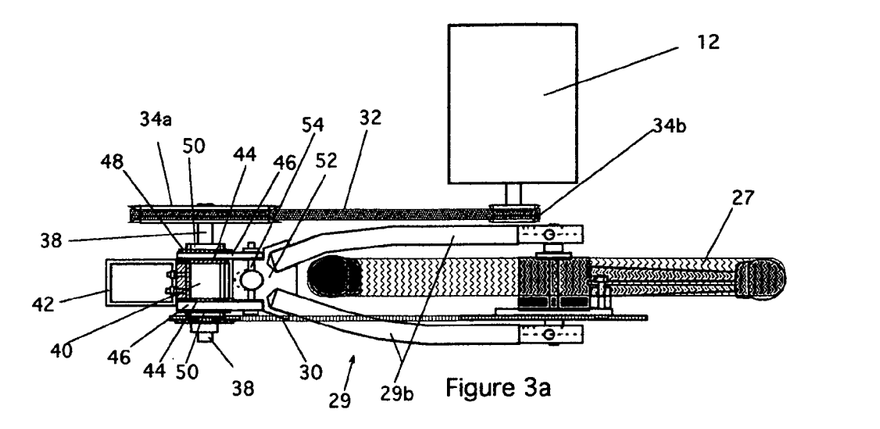
FIG. 3a is a top view of a preferred embodiment of the rear wheel suspension and drive detail.
Figure 3B:
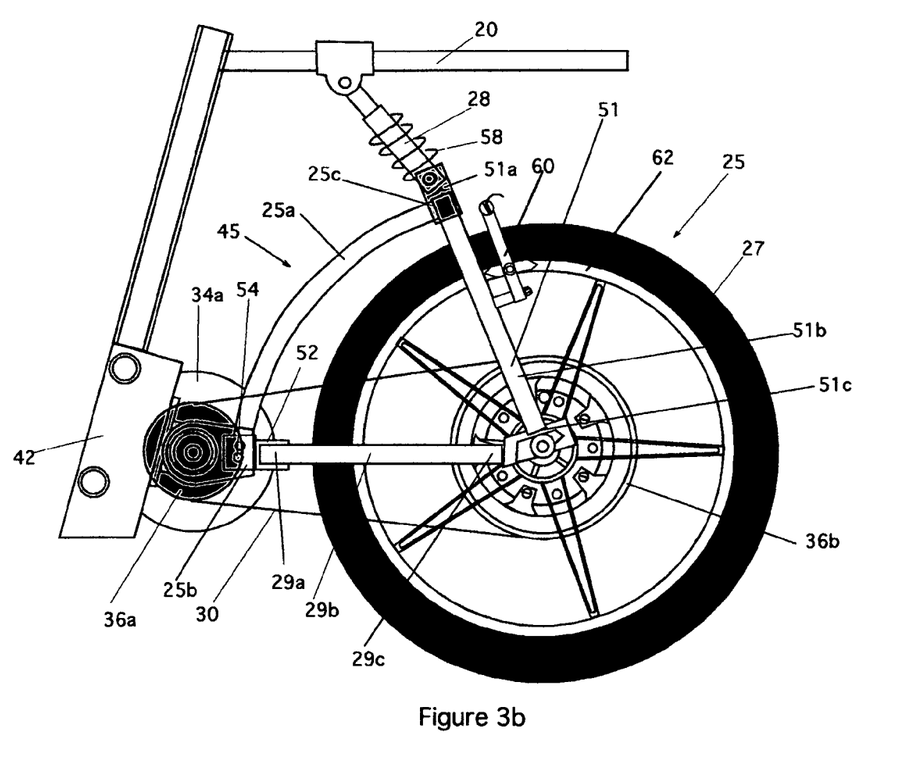
FIG. 3b is a side view of a preferred embodiment of the real wheel suspension and drive detail.

The rear wheel drive and swing arm assemblies 25, shown in FIG. 3a top view and 3b side view, provide an important innovation and critical part of the invention. The two rear wheel drive and swing arm assemblies 25 each comprise a pie-slice-shaped frame 45 with a spine 25a having a pivoting end 25b attached to the bottom of the carriage frame 20 and an upper end 25c. A vertical fork 51 with an upper end 51a is attached to the spine upper end 25c. It has tines 51b and tine ends 51c. A forked horizontal swing arm 29 with a front end 29a is attached to the pivoting end 25b of the spine 25a. The tines 29b and tine ends 29c. The tines 51b of the vertical fork 51 and horizontal swing arm tines 29b are spaced apart to accommodate the width and diameter of a drive wheel 27 and partially surrounding the drive wheel 27 such that the drive wheel axle is rotatably mounted to the tine ends 51c, 29c. A spring suspension shock absorber 58 is attached to the upper end 51a of the vertical fork 51 and the tricycle frame 20 to absorb road shocks as the pie slice shaped frame pivots.

The rear wheels 27 are driven and mounted to produce an independent spring suspension 28 ride as the swing arm 29 allows the wheels to pivot up and down to provide improved ride and traction. Each rear wheel 27 is driven by a combination of a chain drive 30 and V-belt drive 32 as shown. The required speed reduction between the motor 12 and the wheel 27 in this case was approximately 8:1 and was achieved by using different size pulleys 34a, 34b and chain rings 36a and 36b. This also resulted in the same ratio increase in torque between the motor 12 and the wheel 27. The use of individual motors 12 for each of the rear wheels 27 provides for the differential wheel speed needed when going around curves, thus eliminating the weight and need for a differential gear if the two rear wheels 27 were driven by a single motor 12. The range of the Ecotrike™ vehicle in its present implementation is limited by the amount of energy that can be stored in the lead acid batteries 14. Optionally, nickel Metal Hydride batteries 14 could be used to double the range but at 4 to 10 times the cost. A fuel cell battery 14, when it becomes commercially available, could greatly extend the range of the Ecotrike™ vehicle 10.

The large v-belt pulley 34a (shown in FIG. 6) and the small chain sprocket 36a are attached via a steel shaft 38, which is mounted with two ball bearings 43 inside a cylinder 40 rigidly attached to the vehicle body 42. Two large brass bearings 44a and 44b with a shoulder are also mounted, concentric with the drive shaft 38, on the outside and each end of the same cylinder 40. Two metal swinging plates 46, with a hole diameter precisely machined to fit on the brass bearings 44, are then slid over the brass bearing 44 and secured with washers 48a and 48b and a threaded caps 50 at both ends of the cylinder 40 such that the swinging plates 46 are free to swing about the center of the shaft 38 but do not have play in the sideway direction. The threaded caps 50 retain the ball bearings 43, the brass bearings 44 and the swinging metal plates 46.

The swing arm assembly 25 shown in FIG. 3b holding the wheel 27 has, at the forward end of the triangular structure, an aluminum block 52, which is machined to precisely fit between the two swinging plates 46 allowing the wheel end of the assembly 25 to pivot up and down while still maintaining chain 30 tension. This block 52 is then fastened to the plates 46 with two high strength bolts 54 and locking nuts 56. The right angle vertex of the triangular fork structure (see FIG. 3b) is attached to the body frame 20 of the vehicle 10 via a spring 58 and shock absorber 28 to dampen the ride as the drive wheels 27 travel over rough terrain. The spring 58 is designed to carry the large vertical loads of the vehicle 10. The side thrust loads as well as the propulsion and breaking forces exerted parallel to the vehicle path are carried by the brass bearings 44 and the cylinder 40. FIGS. 3a and 3b show the swing-arm suspension 28 of the 20" left rear wheel 27 and its associated chain 30 and v-belt pulley drive 32 system. Note that the swing arm assembly 25 rotates about the center of the pulley drive shaft 38 thus minimizing any change in chain 30 tension during operation of the spring 58 suspension.

It should also be noted that the v-belt pulley drive 34b allows some slippage under high loads or shock loads thus reducing the stresses on the motor shaft and bearings. An important aspect of having the swing arm assembly 25 structure swing about the center of the drive shaft 38 is that the chain 30 tension remains constant despite movement of the spring suspension of the wheels 27. The brakes 60 on this prototype vehicle are caliper bicycle brakes acting on the rim 62. Disc brakes should be considered in future versions to improve brake performance particularly under wet conditions.

General Vehicle Structure Specifications. The preferred vehicle 10 size is approximately 108 inches (270 cm) long, 32 inches (81 cm) wide and 52" (132 cm) high. The area available for the solar panels 16 is 1.2 sqm (1.3 sqyd) providing up to 860 watt-hrs or energy per sunny day. The vehicle 10 weight without rider and batteries 14 is approximately 85 kg (187 lbs). Lead-acid gel cell batteries 14 add another 45 kg (100) lbs of weight. The range is between 10 to 30 miles depending on terrain the amount of sun and pedaling supplied by the rider. One preferred embodiment of the vehicle 10 has 2 gel cell 12-volt lead-acid batteries 14 connected in series to provide 24-volts at a total of 70 amp-hours when fully charged. The electric generator 18 is pedal driven (2–6 amps at 24-volts-up to 150 watts).

Special Features include:

1. Weather protection by an aerodynamic enclosure 64 with removable side windows 66 and door 68 for summer ventilation;
2. Greater safety than for a bicycle or moped, by a high strength tubular aluminum frame 20 enclosure with seat 70 and seat belt (not shown) for rider protection;
3. A comfortable adjustable molded plastic seat 70;
4. Scooter type handlebars 72 for ease of steering, braking and speed control;
5. The speed is controlled by a twist-grip 74 on the handle bar 72;
6. The display panel 76 shown in FIG. 7 displays battery voltage, motor current, speed and sum of battery charge current generated by the solar panels 16 and the pedaling.
7. Front turn signal lights 78, rear turn signal lights 79, brake lights 80, headlights 82 and taillights 83;
8. Front ventilation ducts 84.
9. Horn control and horn 85.

The design also allows ease of servicing by removing the adjustable seat 70 or unmounting the rear platform 86 containing the motors 12, batteries 14 and most of the electrical components 88. The Ecotrike™ vehicle 10 is meant as a commuter vehicle, which is more comfortable and safer than a bicycle. Its legal status in various states and countries is as yet undetermined. It may be classed as a three wheeled moped, scooter or "neighborhood electric vehicle" (NEV). It would be desirable to drive it on bike paths when such are provided on higher speed roads.

Figure 4:
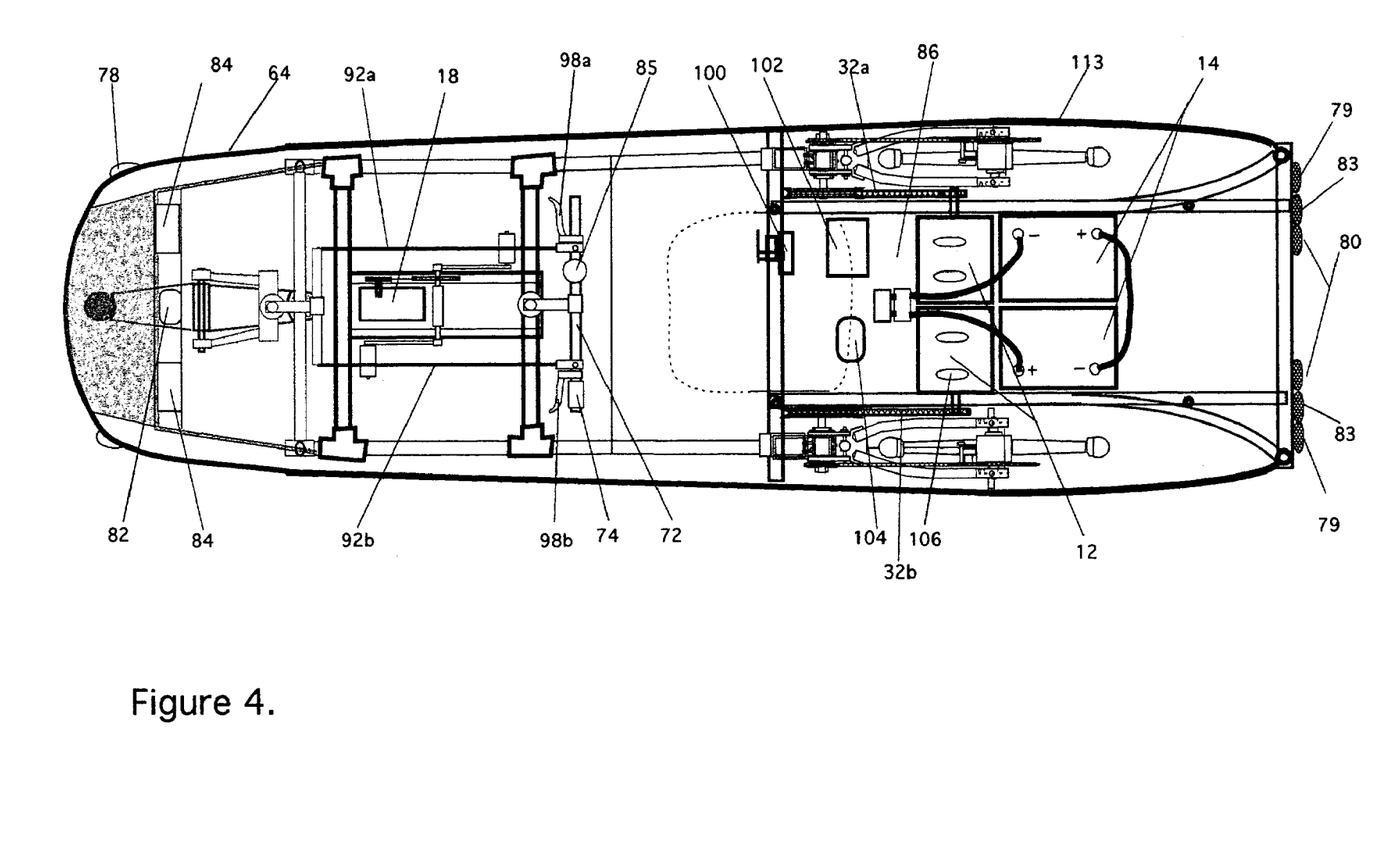
FIG. 4 is a top view of the preferred embodiment of the vehicle shown in FIG. 1.
Figure 5:
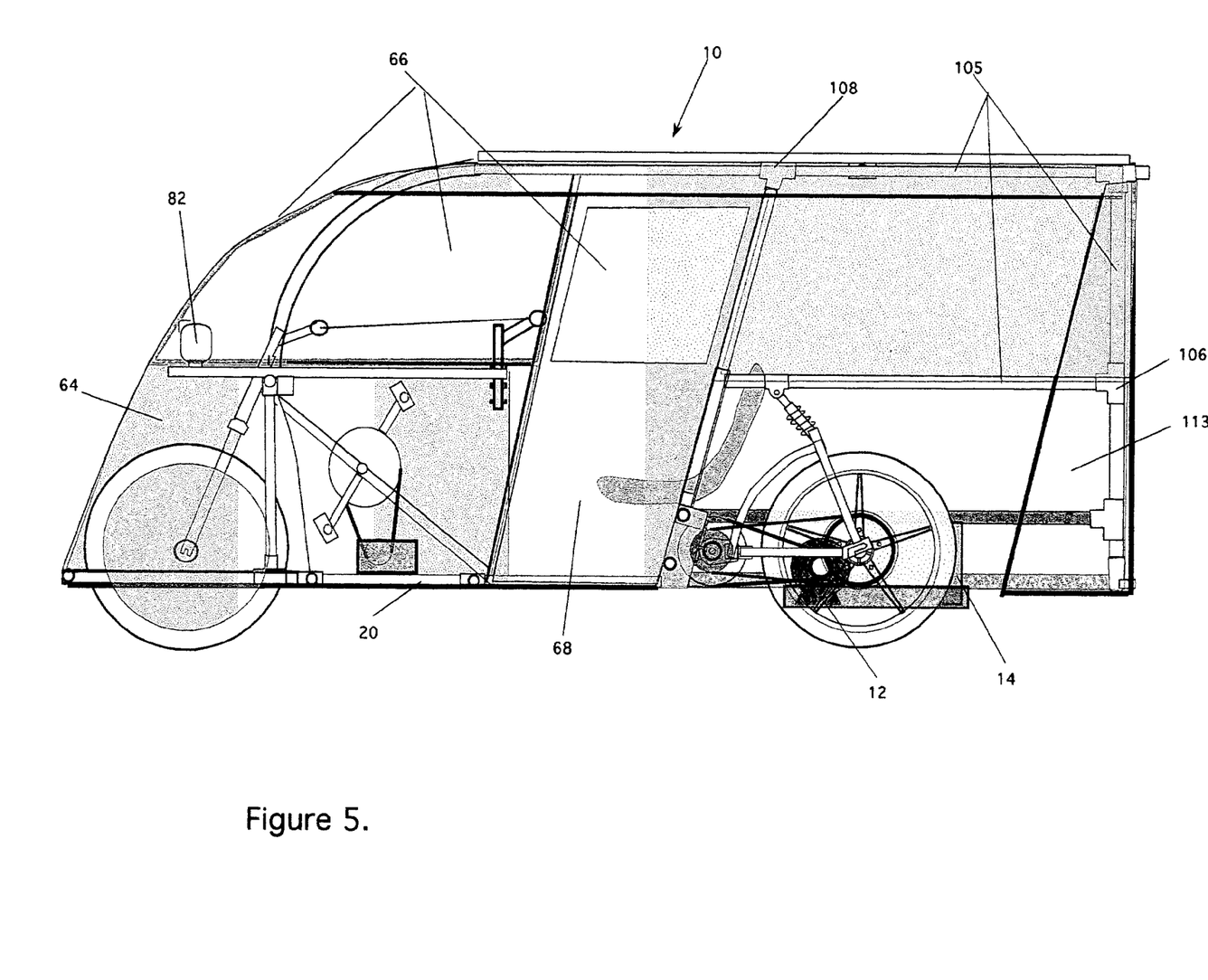
FIG. 5 is a side view of the preferred embodiment of the vehicle shown in FIG. 1.

The basic design layouts of top and side views of the vehicle 10 are shown in FIGS. 4 and 5 respectively. FIG. 4 shows the detailed configuration of Ecotrike™ vehicle 10.

The generator 18 is placed just behind the front wheel 24. The generator 18 is driven by pedaling. The front wheel fork 90 is attached to the handle bar 72 via two cables 92a, 92b. Speed is controlled by rotating a handle grip 74 attached to a variable resistor 94 via a cable 96 (shown in FIG. 7). Braking of the rear wheels is activated by the handlebar lever 98a attached to caliper bicycle brakes 60 of both rear wheels. The caliper brakes 61 of the front wheel are activated by the left handlebar lever 98b. Forward and reverse is achieved by reversing the polarity to the motors 12 using a forward/reverse switch 100 as typically used in golf carts. The pulse-width modulation controller 102 and solenoid switch 104 are placed under the seat of the vehicle. The two motors 12 are mounted on a slotted plate 106 to allow tensioning of the belt drives 32a and 32b. The two batteries 14 are mounted towards the back of the vehicle 10 as shown in FIG. 4.

The body frame 20 of the Ecotrike™ tricycle 10 is made from high strength aluminum alloy 1 inch tubes 105 and L-shaped extrusions (not shown) connected with welded aluminum "Tees" 106, and angled tees 108 and elbows 110. Aluminum L-shaped extrusions (not shown) are also used for the housing of the motors 12 and batteries 14. Aluminum sheets and laminates for the floors 112 and plates of various thicknesses are used to carry required loads of the driver, batteries 14, and motors 12. Lightweight corrugated plastic sheets 113 are used for the rear wheel covers and rear interior. The front part of the vehicle housing 64 is constructed from formed thermo-plastic attached with rivets. Clear UV resistant plastic is used for the windows 66 of the vehicle 10.

Figure 6:
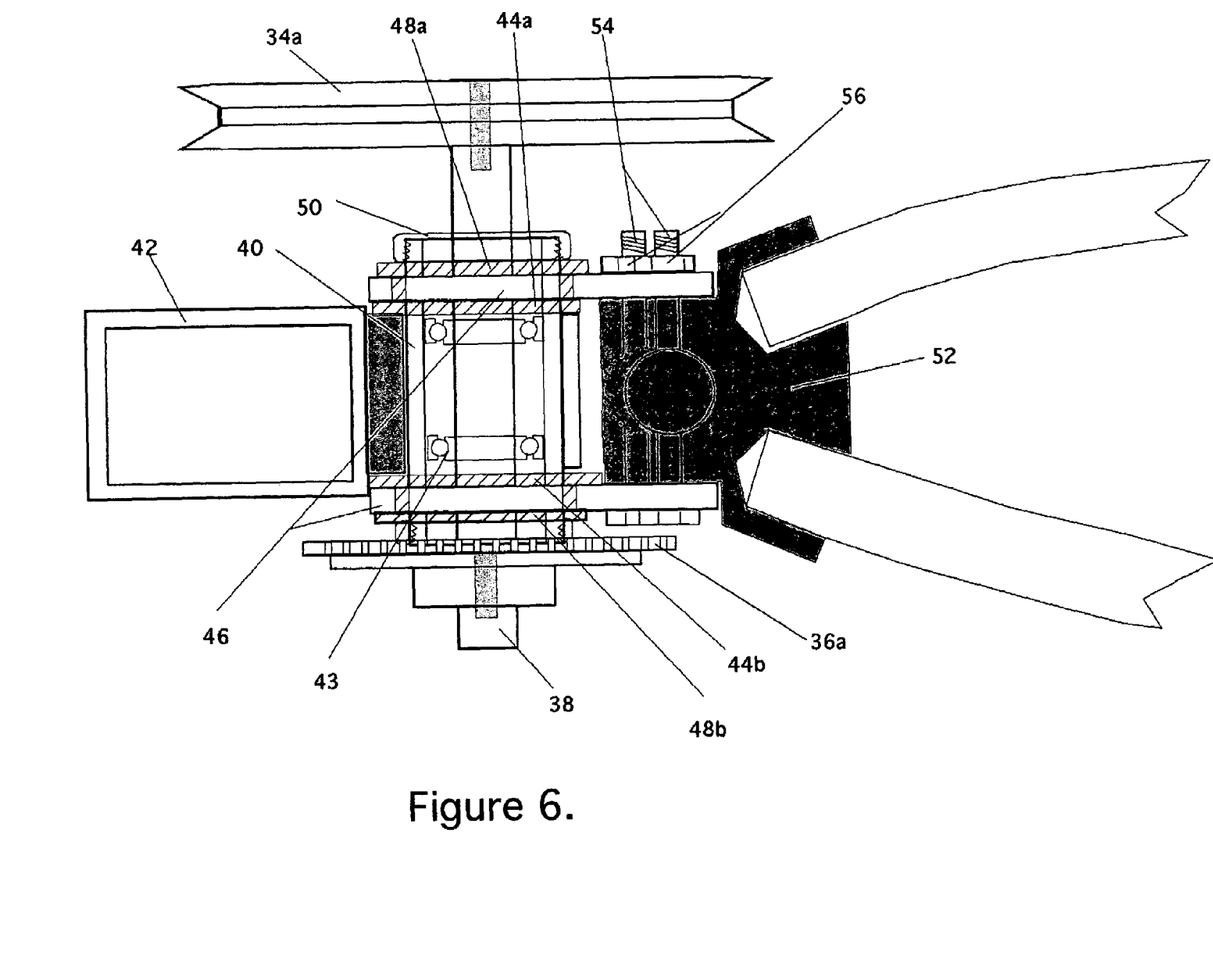
FIG. 6 is a top view detail of a preferred embodiment of the rear suspension swing arm attachment and drive detail.
Figure 7:
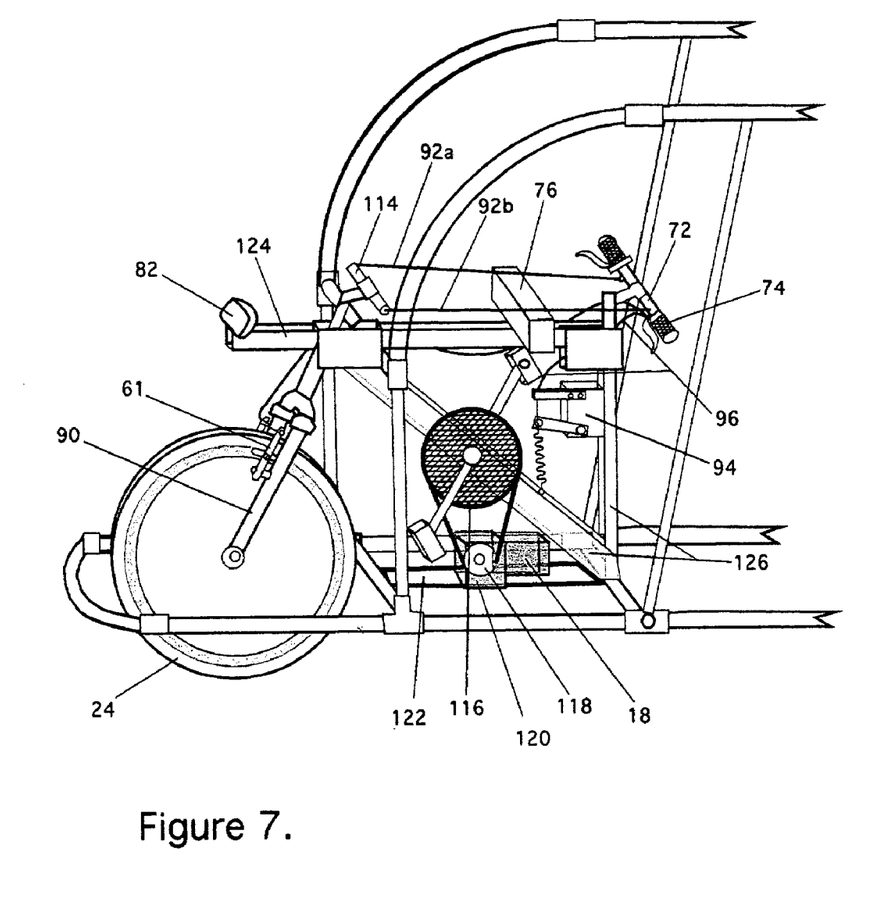
FIG. 7 is a perspective side view of a preferred embodiment of the front wheel steering arrangement and pedal power generator.

The swing arm suspension and drive system assembly 25 of the rear wheels was explained earlier with the description of FIG. 3. FIG. 6 shows a more detailed bottom view of the pivoting arrangement of the swing arm 29 mounting. The schematic diagram for the front wheel suspension, steering and pedal powered generator is depicted in FIG. 7. Steering of the front wheel 24 is accomplished by a horizontal steering bar 114 whose ends are connected via two parallel steel cables 92a, 92b to the right and left side of the steering handle 72. The cables 92a, 92b are arranged in parallel to leave clearance for the display panel 76 and pedals.

The pedal and chain ring 116 drives a smaller sprocket 118, which is attached to a gear box 120 driving the generator 18. The gearbox 120 and chain ring 116 combination produce a rotational speed increase of approximately 50:1 as required by the generator 18. Chain tension is adjusted by moving the gearbox 120 along slots cut in the mounting plate 122. The load bearing structure for the front suspension is constructed from aluminum "L" beams 124, 126 and aluminum tubing 105.

Figure 8:
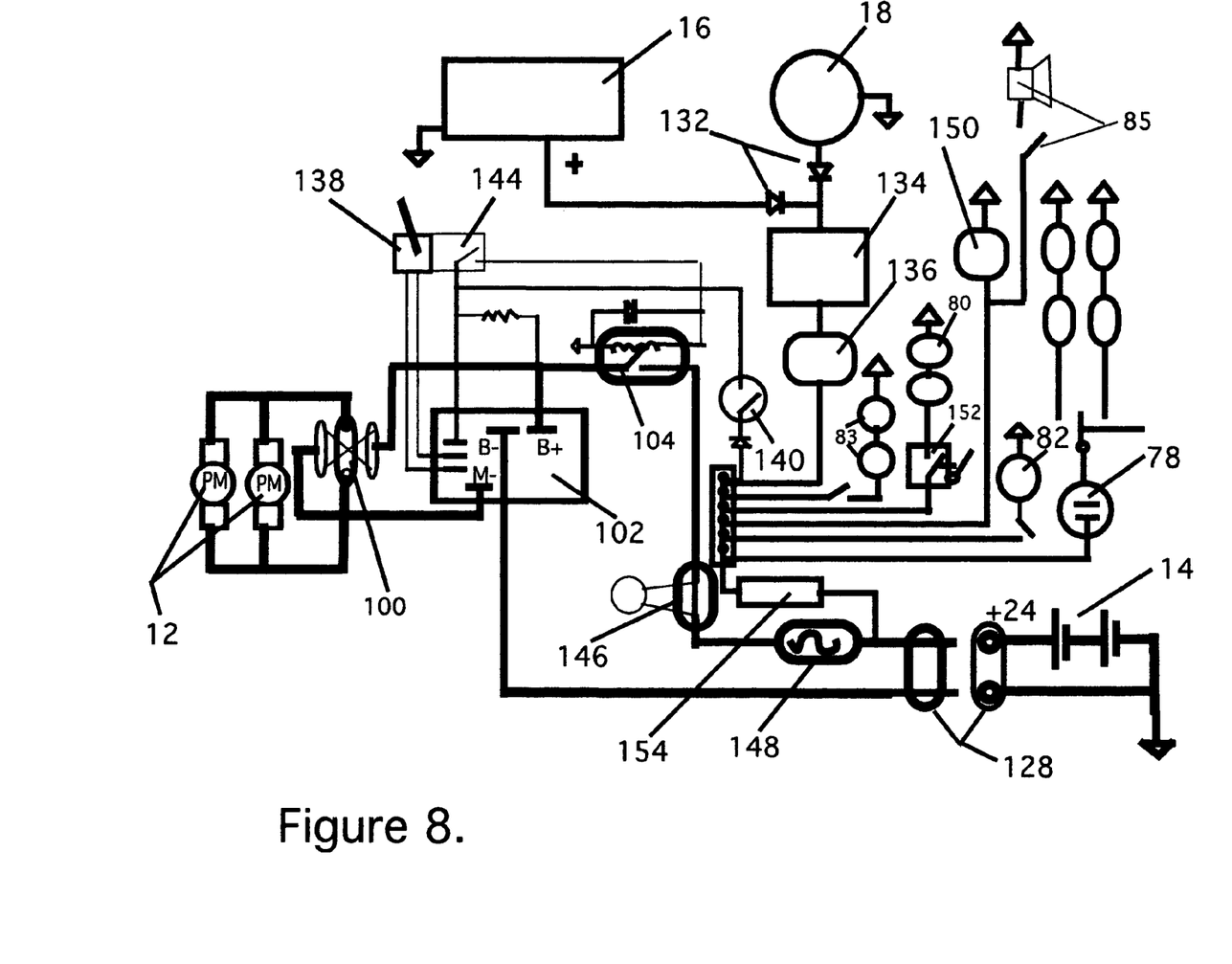
FIG. 8 is a preferred embodiment of an electrical circuit diagram.

A preferred electrical circuit design is shown in FIG. 8. Two 12-volt gel-cell batteries 14 are wired in series to provide 24-volt dc power to the circuits via a connector 128. The gel cell batteries 14 can discharge at up to 200 amperes for short durations. The batteries 14 will maintain 35 amps (1 hp output) for up to 90 minutes. The batteries 14 are charged from the combination of currents generated by the 24-volt photo-voltaic panel 16 and a 24-volt dc generator 18 activated by pedaling. The gear ratio between the pedals 130 and the generator 18 is designed to provide the required charging voltage when pedaling at a comfortable rate of 60 to 90 revolutions per minute. Diodes 132 are included for the photovoltaic panel 16 and the generator 18 to direct charge current only into the batteries 14. A charge controller 134 is provided to prevent overcharging of the batteries 14. A current meter 136 displays the amount of instantaneous charge current provided to the batteries 14 by the two sources.

The two permanent magnet motors 12 are connected in parallel to a high current forward/reverse switch 100 as used in golf carts. The 24 V DC motors 12 are rated at 1 HP (750 watts) continuous and up to 3 HP for short intervals when needed to climb steep slopes or acceleration. The current to the motors 12 is varied by the pulse width modulation (PWM) controller 102 typically used in golf carts. This unit has a maximum rating of 275 amperes and the pulse width of the current pulses is controlled by a variable 5,000 ohm resistor 138, which is varied by a lever pulled by a cable operated by rotating a speed control turn handle on the handlebar. The motor control circuit is activated by first turning on a key-switch 140 and then closing the high current relay 104 by turning on the micro-relay 144 using the speed control turn handle 74 on the handle bar 72. The current to the motors 12 is monitored by the ammeter 146 and protected from overload by the 250 ampere fuse 148. The remainder of the electrical circuit shows the wiring for the turn signal blinker control 78, head light 82, battery volt meter 150, brake switch 152, brake lights 80 rear lights 83 and horn 85. Overload for these circuits is protected by a 20 ampere fuse 154.

Although this specification has made reference to the illustrated embodiments, it is not intended to restrict the scope of the appended claims. The claims, themselves, recite those features deemed essential to the invention.

I claim:

1. A combination Pedal/Motor Driven Tricycle comprising:
   a. a carriage frame having a steering end, and a driving end with a support platform there between structured to provide a passenger compartment with ingress and egress and seating for an operator, when in use;
b. a steering wheel rotatably and pivotally mounted on the steering end,
c. a steering assembly operably associated with the steering wheel and steering end to turn said steering wheel in a desired direction by an operator,
d. a pair of drive wheels rotatably mounted on the driving end,
e. dual direction direct current permanent magnet with pulse width modulation speed control electric motors mounted on the frame and operably associated with each of the drive wheels to move the tricycle at a desired speed and direction and provide differential wheel speed needed when going around curves eliminating the need for a differential gear,
f. a storage battery mounted to the frame operably associated with the electric motors to power the same,
g. a pedal operated electric generator mounted to the frame and operably associated with the storage battery to charge said battery,
h. an aerodynamic enclosure with a top, windows and door surrounding the passenger compartment attached to the frame through which an operator may enter and exit the passenger compartment, said enclosure structured to minimize air resistance to enable the vehicle to be powered by minimal sized motors and batteries meeting the desired performance load and speed requirements,
i. a solar panel mounted to the top of the aerodynamic enclosure also operably associated with the storage battery to charge said battery, and
j. operating controls associated with the electric motor and battery to selectively activate the motor to drive the drive wheels and power the tricycle at a desired speed and forward and reverse directions;
whereby said tricycle components are designed to provide enough power for an operator to meet urban commuter applications within the constraints of energy available from solar, battery and pedal sources.

2. A combination Pedal/Motor Driven Tricycle comprising:
a. a carriage frame having a front steering end, and a rear driving end with a a passenger compartment between the front steering end and rear driving end with ingress and egress and seating for an operator, when in use wherein the rear driving end of the carriage frame has a support platform structured to allow tilting up the front steering end of the tricycle to stand on the rear driving end support platform, when parked;
b. a steering wheel,
c. a steering assembly rotatably and pivotally mounted on the steering end and operably associated with the steering wheel and steering end to turn said steering wheel in a desired direction by an operator,
d. a pair of drive wheels rotatably mounted on the driving end,
e. dual direction direct current permanent magnet electric motors with drive shafts mounted to the frame and operably associated with each of the drive wheels to move the tricycle at a desired speed and direction and provide differential wheel speed needed when going around curves eliminating the need for a differential gear,
f. at least one storage battery mounted to the frame operably associated with the electric motors to power the same,
g. a pedal operated electric generator mounted to the frame and operably associated with the storage battery to charge said battery,
h. an aerodynamic enclosure with a top, windows and door surrounding the passenger compartment attached to the frame through which an operator may enter and exit the passenger compartment, the aerodynamic enclosure structured to minimize air resistance to enable the vehicle to be powered by minimal sized motors and batteries meeting the desired performance load and speed requirements,
i. at least one solar panel mounted to the top of the aerodynamic enclosure operably associated with the storage batteries to charge said batteries, and
j. operating controls associated with the electric motors and battery to selectively activate the motors and batteries to drive the drive wheels and power the tricycle at a desired speed and forward and reverse directions;
whereby said tricycle components are designed to provide enough power for an operator to meet urban commuter applications within the constraints of energy available from solar, battery and pedal sources.

3. A combination Pedal/Motor Driven Tricycle according to claim 2, wherein the support platform is sized such that the tricycle, when tilted on the rear driving end support platform, takes up approximately one fourth of a passenger car's parking space.

4. A combination Pedal/Motor Driven Tricycle according to claim 2, including a pair of rear wheel suspension and drive assemblies associated with each drive wheel having a combination chain drive and V-belt drive using different size pulleys and chain rings to provide a desired wheel drive ratio and some slippage under high loads or shock loads when driven by the electric motors.

5. A combination Pedal/Motor Driven Tricycle according to claim 4, including two rear wheel drive and swing arm assemblies each comprising:
a. a pie-slice-shaped frame with
   i. a spine having a pivoting end attached to the bottom of the carriage frame and an upper end,
   ii. a vertical fork with an upper end attached to the spine upper end with tines and tine ends, and
   iii. a forked horizontal swing arm with a front end attached to the pivoting end of the spine with tines and tine ends,
   the vertical fork and horizontal swing arm tines spaced apart to accommodate the width and diameter of a drive wheel and partially surround the drive wheel such that the drive wheel axle is rotatably mounted to the tine ends, and
b. a spring suspension shock absorber attached to the upper end of the vertical fork and the vehicle frame to absorb road shocks as the pie-slice-shaped frame pivots.

6. A combination Pedal/Motor Driven Tricycle according to claim 5, including two rear wheel drive and swing arm assemblies, each having:
a. a metal block attached to the front end of the forked horizontal swing arm,
b. a cylinder with an inside and an outside rotatably attached to the carriage frame,
c. a swinging plates attached on each side of the metal block rotatably mounted on the outside of the cylinder,
d. the drive shaft concentrically rotatably mounted on the inside of the cylinder, e. a small drive sprocket mounted on an outside part of the drive shaft and aligned with a large sprocket mounted on the wheel, f. a large diameter v-belt pulley mounted on an inside part of the drive shaft, g. small diameter v-belt drive pulley attached to the motor shaft, h. a continuous chain drive connecting the small drive sprocket to the large sprocket, and i. a continuous belt drive connecting the large and small v-belt pulleys.

7. A combination Pedal/Motor Driven Tricycle according to claim 2, wherein the steering assembly comprises:

a. a pivoting fork assembly with a top, and two tines with left and right ends spaced apart to accommodate the width and diameter of a steering wheel whose axle is rotatably mounted between the right and left ends, and the top pivotally attached to the carriage frame to rotate the steering wheel, b. spring suspension shock absorbers incorporated in each of the tines to absorb road shock, c. a steering bar with ends attached to the top of the pivoting fork assembly to turn it in a desired direction, d. a steering handle turnably mounted to the carriage frame, and e. steering cables attached to the ends of the steering bar and operably associated with the steering handle to turn the steering bar in response to the movement of the steering handle.

8. A combination Pedal/Motor Driven Tricycle according to claim 2, including caliper brakes attached to the steering assembly and rear driving end and operably associated with the drive and steering wheels to selectively stop them in a braking mode, and allow them to rotate in a free wheeling mode.

9. A combination Pedal/Motor Driven Tricycle according to claim 2, wherein the solar panel provides in excess of 860 w-hrs per sunny day.

10. A combination Pedal/Motor Driven Tricycle comprising:

a. a tiltable carriage frame having a front steering end, and a rear driving end with a passenger compartment between the front steering end and rear driving end with ingress and egress and seating for a passenger, when in use, wherein the rear driving end of the carriage frame has a support platform structured to allow tilting up the front steering end of the tricycle to stand on the rear driving end support platform, when parked;

b. a steering wheel rotatably and pivotally mounted on the steering end, c. a steering assembly operably associated with the steering wheel to turn said steering wheel in a desired direction by an operator, d. a pair of drive wheels rotatably mounted on the drive end, e. a pair of rear wheel suspension and drive assemblies associated with each drive wheel having a combination chain drive and V-belt drive using different size pulleys and chain rings to provide a desired wheel drive ratio and some slippage under high loads or shock loads when driven by electric motors, f. dual direction electric motors operably associated with each of the drive assemblies to move the tricycle's drive wheels at a desired speed and direction and provide for the differential wheel speed needed when going around curves, eliminating the need for a differential gear, g. at least one storage battery mounted on the frame operably associated with the electric motors to power the motors, h. a pedal operated electric generator mounted to the frame and operably associated with the storage battery to charge the storage battery, i. an aerodynamic enclosure with a top, windows and door surrounding the passenger compartment attached to the frame through which a passenger may enter and exit the passenger compartment, said enclosure structured to minimize air resistance to enable the vehicle to be powered by minimally sized motors and batteries meeting a desired performance load and speed requirements, j. a solar panel mounted to the top of the aerodynamic enclosure operably associated with the storage battery to charge the storage battery, and k. operating controls associated with the electric motors and storage battery to selectively activate the motors and storage battery to drive the drive wheels and power the vehicle at a desired speed and forward and reverse directions;

whereby said vehicle components are designed to provide enough power for an operator to meet urban commuter applications within the constraints of energy available from solar, battery and pedal sources.

11. A combination Pedal/Motor Driven Tricycle according to claim 10, wherein the rear wheel suspension and drive assemblies each comprise:

a. a pie-slice-shaped frame with
   i. a spine having a pivoting end attached to the bottom of the carriage frame and an upper end,
   ii. a vertical fork with an upper end attached to the spine upper end with tines and tine ends, and
   iii. a forked horizontal swing arm with a front end attached to the pivoting end of the spine with tines and tine ends,
   the vertical fork and horizontal swing arm tines spaced apart to accommodate the width and diameter of a drive wheel and partially surround the drive wheel such that the drive wheel axle is rotatably mounted to the tine ends of the vertical forked end of the swing arm, and b. spring suspension shock absorbers associated with the vertical fork tines and vehicle frame to absorb road shocks as the pie-slice-shaped frame pivots, c. a metal block attached to the front end of the forked horizontal swing arm, d. a cylinder with an inside and an outside attached to the carriage frame, f. a swinging plates attached on each side of the metal block rotatably mounted on the outsides of the cylinder, g. a drive shaft concentrically bearing mounted on the inside of the cylinder, h. a small drive sprocket mounted on the outside of the drive shaft and aligned with a large sprocket mounted on the wheel, i. a large diameter v-belt pulley mounted on the inside end of the drive shaft, j. a small diameter v-belt pulley attached to the motor shafts, k. a continuous chain drive connecting the small drive sprocket to the large sprocket, and l. a continuous belt drive connecting the large and small v-belt pulleys.

12. A combination Pedal/Motor Driven Tricycle according to claim 11, wherein the steering assembly comprises:
   a. a pivoting fork assembly with a top, and two tines with left and right ends spaced apart to accommodate the width and diameter of a steering wheel whose axle is rotatably mounted between the left and right ends and the top pivotally attached to the carriage frame to rotate the steering wheel,
   b. spring suspension shock absorbers incorporated in each of the tines connecting the top of the pivoting fork assembly to the carriage frame,
   c. a steering bar with ends attached to the top of the pivoting fork assembly to turn it in a desired direction,
   d. a steering handle turnably mounted to the tilting frame, and
   e. steering cables attached to the ends of the steering bar and operably associated with the steering handle to turn the steering bar in response to the movement of the steering handle.

13. A combination Pedal/Motor Driven Tricycle comprising:
   a. a tiltable carriage frame having a front steering end, and a rear driving end with a passenger compartment between the front steering end and rear driving end with ingress and egress and seating for an operator, when in use, wherein the rear driving end of the carriage frame has a support platform structure to allow tilting to upend the steering end of the tricycle to stand on the rear driving end support platform, when parked;
   b. a steering wheel rotatably and pivotally mounted on the steering end,
   c. a steering assembly operably associated with the steering wheel and steering end to turn said steering wheel in a desired direction by an operator, the steering assembly consisting of
      i. a pivoting fork assembly with a top, and two tines with left and right ends spaced apart to accommodate the width and diameter of a steering wheel whose axle is rotatably mounted between the right and left ends, and the top pivotally attached to the carriage frame to rotate the steering wheel,
      ii. spring suspension shock absorbers incorporated in each of the tines to absorb road shock,
      iii. a steering bar with ends attached to the top of the pivoting fork assembly to turn it in a desired direction,
      iv. a steering handle turnably mounted to the carriage frame, and
      v. steering cables attached to the ends of the steering bar and operably associated with the steering handle to turn the steering bar in response to the movement of the steering handle,
   d. a pair of drive wheels rotatably mounted on the driving end,
   e. a pair of rear wheel suspension and drive assemblies associated with each drive wheel having:
      i. a combination chain drive and V-belt drive using different size pulleys and chain rings to provide a desired wheel drive ratio and some slippage under high loads or shock loads when driven by electric motors, and
      ii. a pie-slice-shaped frame with
         1. a spine having a pivoting end attached to the bottom of the carriage frame and an upper end,
         2. a vertical fork with an upper end attached to the spine upper end with tines and tine ends, and
         3. a forked horizontal swing arm with a front end attached to the pivoting end of the spine with tines and tine ends, the vertical fork and horizontal swing arm tines with dimensions spaced apart to accommodate the width and diameter of a drive wheel to partially surround the drive wheel,
         4. a spring shock absorbing assembly attached to the upper end of the vertical fork between the vertical fork and vehicle frame to allow the pie slice shaped frame to pivot and absorb road shocks,
         5. a metal block attached to the front end of the forked horizontal swing arm,
         6. a cylinder with an inside and outside attached to the carriage frame housing,
         7. a swinging plates attached on each side of the metal block rotatably mounted on the outsides of the cylinder,
         8. a drive shaft concentrically mounted with ball bearings on the inside of the cylinder,
   f. two reversible direct current permanent magnet electric motors with drive shafts mounted on the carriage frame, each with
      1. a small drive sprocket mounted on the outside of the motor drive shaft,
      2. a large sprocket mounted on the drive wheel axle and aligned with the small drive sprocket,
      3. a large diameter v-belt pulley mounted on the inside of the motor drive shaft,
      4. a small diameter v-belt drive pulley attached to the inside of the motor drive shaft,
      5. a continuous chain drive connecting the small drive sprocket to the large sprocket, and
      6. a continuous belt drive connecting the motor drive pulley and v-belt pulleys operably associated with the electric motors for each of the drive wheels to move the tricycle in a desired direction, as the electric motors provide for the differential wheel speed needed when going around curves eliminating the need for a differential gear,
   g. at least one storage battery mounted on the carriage frame operably associated with the electric motors to power the same,
   h. a pedal operated electric generator mounted on the carriage frame and operably associated with the storage batteries to charge the batteries,
   i. an aerodynamic enclosure with a top, windows and door surrounding the passenger compartment attached to the frame through which an operator may enter and exit the passenger compartment, said enclosure structured to minimize air resistance to enable the tricycle to be powered by minimally sized motors and batteries meeting the desired performance load and speed requirements,
   j. a solar panel mounted to the top of the aerodynamic enclosure operably associated with the storage battery to charge the storage batteries, and
   k. operating controls associated with the electric motors and storage batteries to selectively activate the same to drive the drive wheels and power the tricycle at a desired speed and forward and reverse direction.

* * * * *